(12) United States Patent
Jhe et al.

(10) Patent No.: US 6,459,659 B1
(45) Date of Patent: Oct. 1, 2002

(54) RECORDING MEDIUM HAVING PLANAR APERTURE ARRAY AND FABRICATION METHOD THEREOF, AND NEAR-FIELD OPTICAL RECORDING/REPRODUCING DEVICE USING SAME AND METHOD THEREFOR

(75) Inventors: Won Ho Jhe, Sibeom Apt. 13-25, Yoido-Dong, Yongdungpo-Ku, Seoul (KR); Myong R. Kim, Kyungki-Do (KR); Ki Hyun Kim, Seoul (KR)

(73) Assignee: Won Ho Jhe, Seoul (KR)

( * ) Notice: Subject to any disclaimer, the term of this patent is extended or adjusted under 35 U.S.C. 154(b) by 0 days.

(21) Appl. No.: 09/364,530

(22) Filed: Jul. 28, 1999

(51) Int. Cl.⁷ .................................................. G11B 7/00
(52) U.S. Cl. .................................. 369/44.11; 369/275.3
(58) Field of Search ............................ 369/103, 112.01, 369/112.23, 275.4, 284, 288, 275.1, 44.23, 275.3, 94, 118, 44.11, 44.14, 44.15, 44.16, 109, 111; 250/216

(56) References Cited

U.S. PATENT DOCUMENTS

| | | | |
|---|---|---|---|
| 4,659,429 A | 4/1987 | Isaacson et al. ............ 156/644 |
| 5,883,872 A | 3/1999 | Kino ........................... 369/112 |
| 5,973,316 A | 10/1999 | Ebbesen et al. ............ 250/216 |
| 6,094,413 A | * 7/2000 | Guerra ................... 369/112.01 |

* cited by examiner

Primary Examiner—Thang V. Tran
(74) Attorney, Agent, or Firm—Chienowei (Chris) Chou; Oppenheimer Wolff & Donnelly LLP

(57) ABSTRACT

A recording media for recording/reproducing information by using an near-field, overcoming a diffraction limit, and having an ultra-high recording density, and a fabrication method thereof, and a recording/reproducing device are disclosed. The optical recording medium includes a planar aperture array which can generate the near-field light, an information recording layer, and a spacer maintaining a predetermined gap between the planar aperture array and the recording layer, the gap being sealed from an external environment. The optical recording/reproducing device is controlled by a macro-servo and a micro-servo, thereby recording/reproducing the information by using the planar aperture array thereof. As a result, the present invention overcomes a diffraction limit, achieves the ultra-high recording density, and thus records a large amount of information even on the small area.

18 Claims, 5 Drawing Sheets

RECORDING MEDIUM HAVING PLANAR APERTURE ARRAY AND FABRICATION METHOD THEREOF, AND NEAR-FIELD OPTICAL RECORDING/REPRODUCING DEVICE USING SAME AND METHOD THEREFOR

BACKGROUND OF THE INVENTION

1. Field of the Invention

The present invention relates to an optical recording medium and a fabrication method thereof, and to a near-field recording/reproducing device for recording/reproducing data on/from the optical recording medium, and to a method for, and in particular to a recording medium for recording/ reproducing information by using an evanescent field transmitting an electromagnetic interaction controlled in the visible light and infrared regions, overcoming a diffraction limit, and having an ultra-high recording density, and a fabrication method thereof, and to a near-field optical recording/reproducing device for recording/reproducing information on the recording medium, and a method therefor.

2. Description of the Background Art

As the multimedia era in which information of various types, such as audio and video motion picture and text files are integrated has begun, there is an increasing demand for information recording and storage media having a large capacity which can rapidly process and store a large amount of information. Especially, if a two-way picture communication, such as a high definition motion picture and a video-on-demand (VOD) which are expected to be widely distributed is to be realized, the information recording and storage media must be increased in capacity. In order to meet the demand, various recording/reproducing methods have been suggested for the commonly-used recording media, and a magnetic recording method and an optical recording method are commonly used among the methods.

A prime example of the magnetic recording method is a method of recording/reproducing information on a hard disk by using a hard disk drive (HDD).

In order to store more information on the hard disk, the recording density of the hard disk should be improved. For this, a flying height between a head and a recording medium must be lowered. Here, in order to reduce the flying height, a lower portion of the head must be located very closely to the recording medium. However, when the lower portion of the head approaches to closely to a surface of the recording medium, the head scratches it, so called "a head crash" takes place, thereby damaging the recording medium and reducing the reliability thereof.

In addition to the method of improving the recording density by lowering the flying height between the head and the recording medium, there is a method of reducing a size of a MR-head (magnetic-resistive head) in the hard disk drive.

In the case of a longitudinal magnetic recording medium which has been popularly used, if the size of the particles composing each magnetic domain is lesser than a critical size, a recording bit causes magnetic inversion due to thermal fluctuation in an environment of a normal temperature. As a result, the recording medium cannot be well operated. This phenomenon is called a "super-paramagnetic limit". It is thus impossible to record and retain information on the magnetic disk at an ultra-high recording density exceeding the limit. If the study for the high recording density of the magnetic recording medium proceeds according to the current tendency, it is expected that a limit value thereof will reach to 40 Gbit/in$^2$ around 2005.

On the other hand, the optical recording method is a method of recording/reproducing information on a recording medium, an optical pickup not being contacted with the recording medium. It does not have such a problem as the head crash occurring in the magnetic recording method. Accordingly, an optical recording medium such as a compact disk (CD) using the optical recording method can partially replace the magnetic recording media such as a magnetic tape and a magnetic disk using the magnetic recording method. In addition, the optical recording medium according to the optical recording method can be easily installed in the optical recording device using the optical recording method, and is convenient to carry. For instance, even if a CD drive is operated in a moving vehicle, a head of the optical recording device and the optical recording medium do not physically damage each other, and thus the information recorded on the optical recording medium is retrieved in safe manner. Also, the optical recording medium has a narrow track pitch, as compared with the magnetic recording medium, thereby achieving the higher recording density.

Nevertheless, a storage amount of the CD which has been widely distributed is only 650 megabytes. Accordingly, it is too small to deal with a large amount of information such as motion picture. In addition, in the case of a digital versatile disk (DVD) which has been recently commercialized, a recording capacity thereof is seven times as much as that of the CD (4.7 GB). However, a new recording medium having a larger capacity than DVD is required in order to freely deal with the motion pictures like movies. Thus, many studies have been made in association with the ultra-high recording density of the recording medium.

The ultra-high recording density will now be described exemplifying optical recording media, such as a read only memory (ROM) and a rewritable memory (-RAM/RW). The most important factor influencing the recording density of the optical recording media is a spot size of a laser light beam. That is, the smaller the spot of the laser beam is, the more information we can record in the optical recording medium. For this, the wavelength of a laser light source must be shortened, and a numerical aperture (NA) of an objective lens of the optical pickup must be increased.

However, although the wavelength of the laser light source is shortened and the numerical aperture of the objective lens is increased, the size of the spot of the laser beam can be narrowed merely to the extent of the wavelength of the laser source. For example, in order to shorten the wavelength of the laser light source, when a laser diode having a wavelength of 400 nm is used as a light source of the digital versatile disk DVD, instead of a laser diode having a wavelength of 650 nm which has been used for the DVD, the amount of information recorded per unit area of the DVD can be approximately 2.5 times as much as an amount of the information of the recording medium when the laser diode having the wavelength of 650 nm is used.

However, even if the short wavelength laser diode is employed as a light source for recording information on the optical recording media, such as the CD and the DVD, there is still a recording limit. In addition, it is impossible to improve the recording density of the recording media over a predetermined limit by overcoming the diffraction limit, due to a property of the diffraction resulting from the wave-nature of the light.

Accordingly, in order to process information of a terabyte, the ultra-high recording methods such as a near-field optics, a volume hologram, a photo-chemical hole burning and a three-dimensional optical recording are suggested on the basis of a totally different principle from the conventional art.

However, in the cases of the volume hologram and the photo-chemical hole burning, there is a remarkable limit in an environment of using the recording medium. Practically, the optical recording medium using the near-field cannot be easily used.

The background of inventing the near-field method will now be explained.

In general, in a diffraction theory, the spot size (diameter) of a focused light is determined by the optical wavelength and the numerical aperture of the objective lens. An upper limit of the recording density of the recording medium is determined by how small the light focusing spot is formed. According to the diffraction phenomenon, as a beam size of the light is reduced by using a lens, the beam is more widened. It is represented by the following expression (1).

$$\theta = \frac{2\lambda}{\pi d} \cong \frac{\lambda}{d} \quad (1)$$

Here, "θ", "d" and "λ" indicate the diffraction angle, the waist of the beam, and the wavelength of the light, respectively. According to the diffraction theory, if the size of the beam is reduced by using the lens, the diffraction angle is increased. In addition, the beam size cannot be less than a predetermined value originated from the diffraction limit.

Therefore, a limit of the recording density of the optical recording medium is governed by the diffraction theory of light which is approximately represented by the following expression (2).

$$d \cong \frac{1.22\lambda}{NA} \quad (2)$$

Here, "d", "λ" and "NA" indicate the waist of the beam, the wavelength, and numerical aperture of an objective lens. That is, the shorter the wavelength (λ) of the laser light source is, and the more the numerical aperture of the lens NA is increased, the smaller the focused beam size is. The recording density of the recording medium is increased in an inverse proportion to the square of the spot size. A minimum size of the information which can be recorded/reproduced per bit approximately corresponds to the light wavelength because of the diffraction resulting from the wave-nature of light.

Accordingly, it is the best method in the conventional art to increase the recording density by shortening the light wavelength, and by decreasing the size of the focused spot with the lens having large aperture. It is expected that the recording density which may be obtained by this method is between 20 and 30 Gbit/in$^2$. Thus, the conventional system has a disadvantage in that the light is used as an electromagnetic wave, and thus there is a limit resulting from the diffraction in improving the recording density.

In order to overcome the diffraction limit, a light existing in an evanescent field of a near-field region (i.e., a distance less than the light wavelength from a material surface) is employed on the recording medium. That is, a concept that the light (an evanescent light around the aperture) is not emitted from an aperture shorter than the light wavelength, but interacts with a material positioned around the aperture, is applied to recording/reproducing of the information on the recording medium, thereby overcoming the diffraction limit.

For this, in the conventional art, after an optical fiber is sharpened, and a metal film (reflective film) such as aluminum is deposited, the metal film at an edge portion of the optical fiber is removed, thereby forming an aperture smaller than the light wavelength. The optical fiber is used as a probe. When the light is incident on the end of the optical fiber, the light having a normal wavelength is not emitted from the probe, and only the evanescent light is obtained.

Consequently, the aperture formed by the optical fiber in the conventional art overcomes the diffraction limit, and improves the recording density of the optical recording media. That is, the above-described method employs the evanescent light in order to prevent a phenomenon of widening the spot due to the light diffraction, and to reduce the spot size to less than the light diffraction limit.

Here, the evanescent light is a local interaction between polarizations generated in a material due to the irradiation of light. When the edge portion of the optical fiber is sharpened, and injected around a sample surface, the resolution thereof is determined by the sharpness of the edge portion of the optical fiber probe, thereby overcoming the diffraction limit of the light. In this case, a size (diameter) of the evanescent light beam is too small (equal to a size of the edge portion of the optical fiber) to be made by using an optical device such as a lens causing the diffraction phenomenon.

However, in the recording/reproducing process, it is necessary to locate the probe by as close as a dimension of the size of the end portion of the probe to the optical recording medium having a dimension of a particle size corresponding to a dimension of the size of the end portion of the probe, and to inject the probe in such state. A nanometer technology is required to embody this system.

As described above, the method used in the system for recording/reproducing the information on the recording medium by using the near-field generally employs the optical fiber as the probe, the end portion of which being sharpened at its edge portion, covered with the metal film, and provided with an aperture much smaller than the light wavelength. The light emitting from the probe is not diffracted in the near-field region, and can form very small spots. Thus, it can be utilized to observe a material surface or a physical phenomenon, and to record/reproduce the high-density information.

Here, a continuous servo is required to bring the recording medium in the near-field region. In case an external impact is applied or the material surface is uneven in the recording/reproducing process, the optical fiber tip may be damaged.

On the other hand, a scanning near-field optical microscopy SNOM used for obtaining high resolution is applied to the recording medium for recording the information. Here, the SNOM has a disadvantage in that an output signal is very weak. As the near-field light locally existing around microapertures is used to record/reproduce the information on the recording medium, the reproducing signal amount is very small(~10 nW). Accordingly, if the data transfer rate is increased (for example, to 10 MHz or more), the signal-to-noise ratio is reduced.

Here, the SNOM requires the development of a control technique of constantly maintaining the optical fiber from the surface of the recording medium by a gap less than or equal to 10 nm, a precise control servo-technique in the media plane, and a beam high speed scanning method for achieving a high data transfer rate. In addition, a first step which should be taken for recording the information on the recording medium by using the evanescent light is, as described above, to develop a highly sensitive optical recording medium which can react to a small amount of energy because the throughput of the micro-aperture is relatively low.

As discussed earlier, in principle, the information can be recorded and reproduced on the recording medium at a high recording density by using the near-field. However, when the optical recording medium is fabricated according to the conventional method, there are several disadvantages, as follows:

(a) A precise gap control must be performed in order to constantly maintain a distance between the probe and the recording medium surface (~a few tens nm). It requires a complicated device including a plurality of components, such as a dithering piezoelectric device (PZT), a laser diode (LD), a collimating lens, an optical detector, an amplifier, a lock-in amplifier and a proportional integrator (PI).

(b) It is difficult to process the optical fiber tip to be used for minimizing the spot size of the laser light source. A small number of the fiber tips and apertures having a uniform size can be fabricated in a place such as a laboratory. However, this method is not appropriate for mass production.

(c) The relative movement of recording media over a optical pickup is so rapid that the probe and the recording medium including the information can be easily damaged. The recording device recording and reproducing the information on the recording medium having a high recording density should rapidly approach a position where the wanted information is located. For this, a relative moving speed of the recording media surface and the probe must be high. However, when moved, the probe may collide with the surface of the recording medium. In case the probe is damaged by the collision, it influences on the recording and reproducing characteristics, thereby reducing the reliability of the recording medium.

(d) When a rewritable medium is used for the near-field optical recording, the rewritable medium surface is externally exposed in order to position the recording medium within the near-field region, differently from the CD method. Consequently, the surface of the medium may be contaminated and scratched.

SUMMARY OF THE INVENTION

Accordingly, it is a primary object of the present invention to provide a recording medium of a ultra-high recording density having a planar aperture array.

It is another object of the present invention to provide a method for fabricating a recording medium of an ultra-high recording density having a planar aperture array.

It is still another object of the present invention to provide an optical recording/reproducing device which can record and reproduce information on a recording medium of an ultra-high recording density by using a near-field optics.

It is still another object of the present invention to provide a method for controlling an optical recording/reproducing device which can record and reproduce information on a recording medium of an ultra-high recording density by using a near-field.

In order to achieve the above-described objects of the present invention, there is provided a recording medium including a planar aperture array generating a near-field light by an incident laser light, and a recording layer positioned separately from the planar aperture array by a predetermined gap. Here, a size of the aperture of the planar aperture array is smaller than a wavelength of the laser light source so that the aperture can receive the laser light source and generate the near-field light. The gap between the planar aperture array and the recording layer is determined to be in the near-field. The gap is constantly maintained by spacer having a predetermined dimension, and sealed up with a flexible material, and thus inner portions of the planar aperture array and the recording layer are protected from an external environment. In addition, the recording medium further includes a piezoelectric device. The piezoelectric device is driven by a micro-servo, and thus the planar aperture array and the recording layer can be relatively horizontally moved. The recording layer may or may not include a reflection layer, and thus can record and reproduce the information at the both sides or one side thereof.

There is also provided a method for fabricating optical recording media including: a step of fabricating a multi-layer recording media on a first substrate; a step of fabrication of a planar aperture array on a second substrate; and a step of bonding the first substrate and the second substrate having a predetermined gap. Especially, the step of forming the planar aperture array includes a step of forming a film by sputter deposition of a reflective layer on the second substrate; a step of coating a photo-resist (PR) on the reflection layer; a step of forming a pattern of the planar aperture array on the PR coating by using an electron beam; and a step of etching the planar aperture array pattern in an etching solution. In addition, it further includes a step of sealing up the gap between the first substrate and the second substrate in order to be protected from an external environment.

In the method for fabricating the recording medium in accordance with a preferred embodiment of the present invention, the step for forming the planar aperture array can be performed by a plastic forming process.

There is also provided a recording/reproducing device including: a pickup unit generating a near-field light at aperture in the recording media having a planar aperture array and a recording layer; a piezoelectric device PZT included in the pickup unit; a driving unit of the PZT; and a signal processing unit recording and reproducing information on the recording medium. Especially, the PZT driving unit operates the PZT included in the pickup unit, thereby carrying out a macro-servo in order for the pickup unit to store/reproduce information at a predetermined position of the recording medium.

There is also provided a recording/reproducing method of a recording medium including: a step of detecting an address of information to be recorded or reproduced at a predetermined position of the recording medium; a step of moving a pickup unit according to the detected address; and a step of recording/reproducing on the recording medium a signal inputted/detected from the pickup unit moved to the predetermined position.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

In accordance with the present invention, a recording medium having an ultra-high recording density which can record and reproduce information by using a near-field of a light beam and an optical recording/reproducing device corresponding to the recording medium will now be described.

Figure 1A:
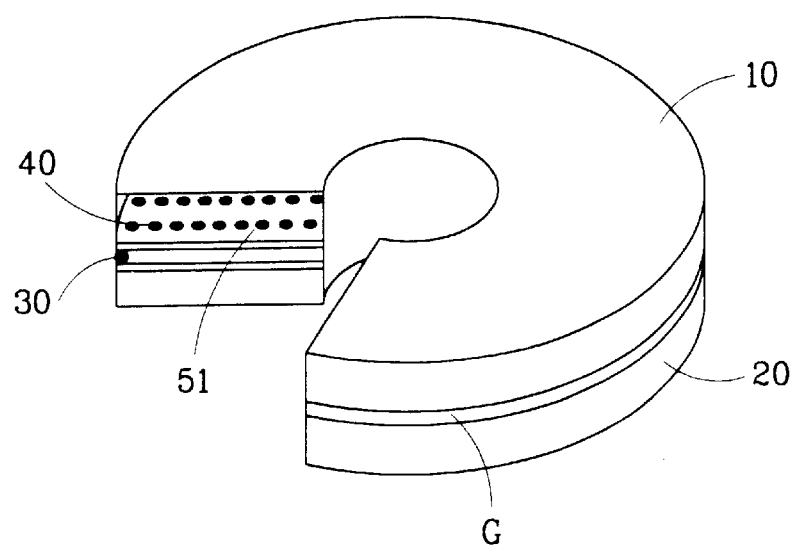
FIG. 1A illustrates a schematic illustration of a circular optical recording media of an ultra-high recording density having a planar aperture array in accordance with the present invention.

FIG. 1A illustrates a circular optical recording medium of an ultra-high recording density having a planar aperture array in accordance with a preferred embodiment of the present invention. As shown therein, the circular optical recording medium includes a upper plate 10 and a lower plate 20 which are joined together. Here, the upper plate 10 includes a planar aperture array (PAA) 51 having a plurality of apertures 40, and the lower plate 20 includes a recording layer 60 which can record information. A spacer 30 is provided between the PAA 51 of the upper plate 10 and the recording layer 60 of the lower plate 20 in order to maintain a predetermined gap G therebetween.

Figure 1B:
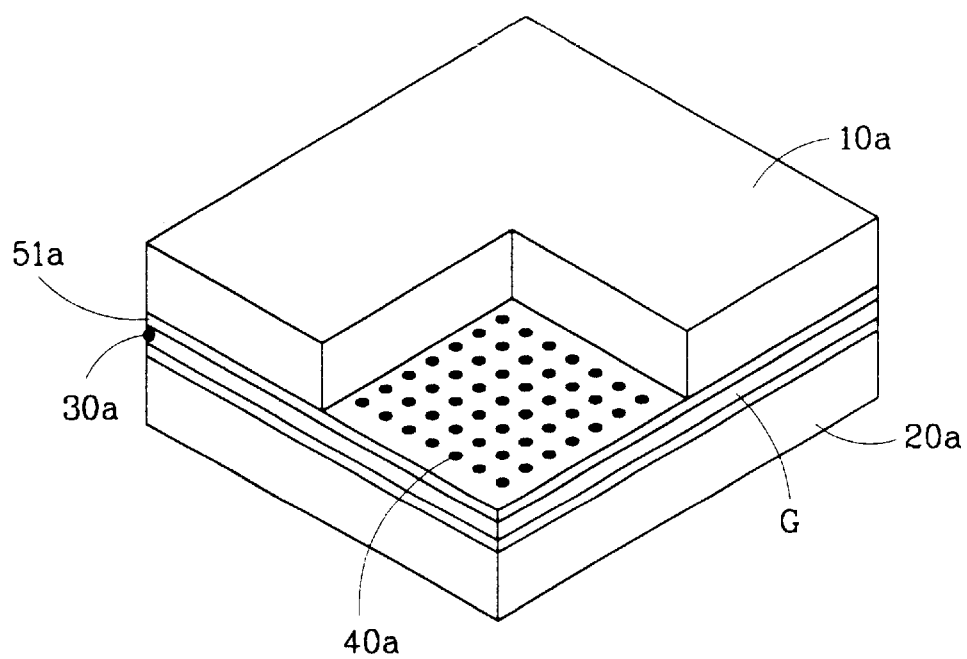
FIG. 1B illustrates a schematic illustration of a rectangular optical recording media of an ultra-high recording density having a planar aperture array in accordance with the present invention.

FIG. 1B illustrates a rectangular shape of an optical recording media of an ultra-high recording density having a planar aperture array in accordance with a preferred embodiment of the present invention. The rectangular optical recording medium has an identical structure to the medium shown in FIG. 1A. The circular and rectangular optical recording media are exemplified in accordance with the preferred embodiment of the present invention, but it will be understood by the those skilled in the prior art the optical recording medium may be embodied in various shapes.

Figure 2A:
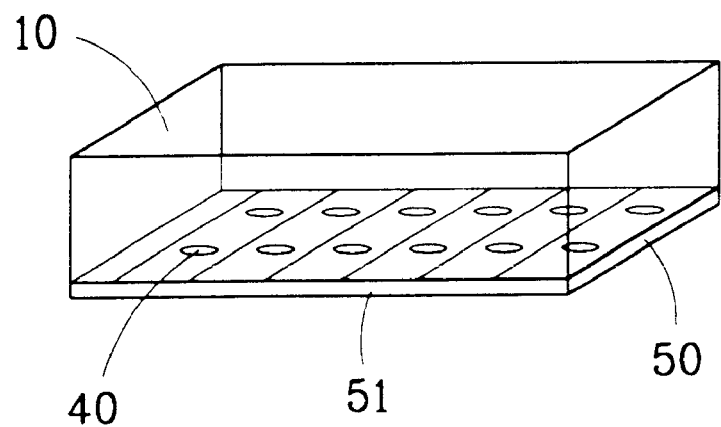
FIGS. 2A and 2B illustrate an upper plate and a lower plate of the optical recording media in accordance with a preferred embodiment of the present invention, respectively.
Figure 2B:
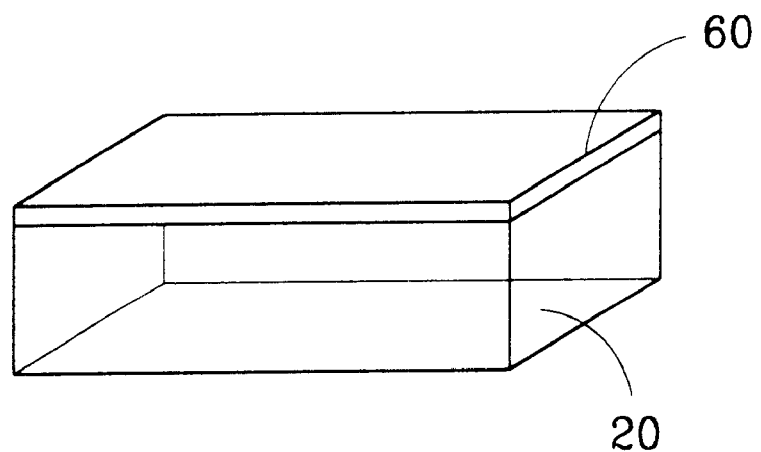
Figure 2C:
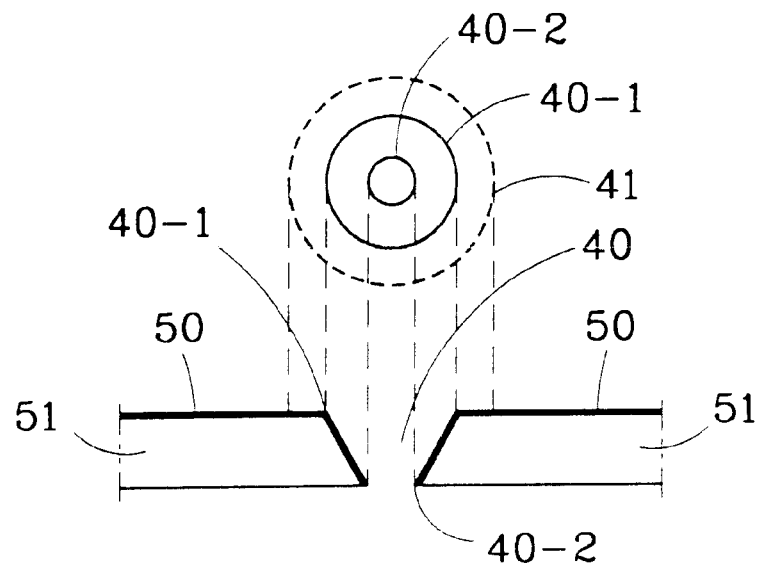
FIG. 2C is a detailed schematic diagram illustrating a circular shaped aperture.
Figure 2D:
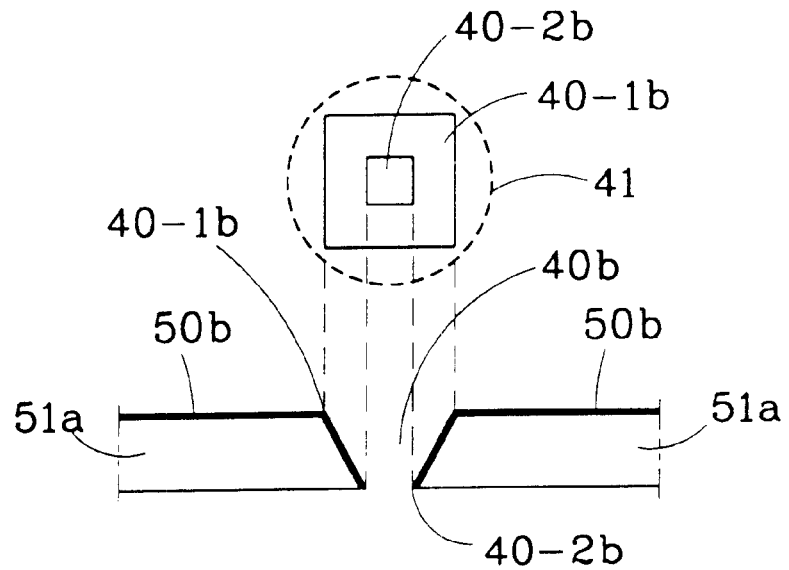
FIG. 2D is a detailed schematic diagram illustrating a rectangular aperture.

FIG. 2A is a detailed diagram illustrating the upper plate 10 of the optical recording media in FIG. 1A. A metal coating layer 50 consisting of aluminum or its alloy is provided at one side of the PM 51 in order to make a narrow beam spot only on the aperture region from the laser light incident from an upper portion of the upper plate 10. FIG. 2B is a detailed diagram illustrating the lower plate 20 of the optical recording medium in FIG. 1A. The lower plate 20 consists of glass or poly-carbonate which is transparent. FIG. 2C is a detailed diagram illustrating the circular aperture 40 formed on the PAA 51. The circular aperture 40 includes a large diameter part 40-1 having a relatively large diameter at its upper portion, and a small diameter part 40-2 having a relatively small diameter at its lower portion (toward the recording layer). A laser beam 41 incident on the PAA 51 is outputted through the small diameter unit 40-1, and the laser beam incident outside the small diameter unit 40-1 is reflected by the metal coating layer 50 to give a small spot just below the aperture array. FIG. 2D is a detailed diagram illustrating a rectangular aperture 40b formed on the PAA 51a. The rectangular aperture has an identical function to the circular aperture in FIG. 2C. The circular and rectangular apertures are exemplified in the present invention, but it will be understood by the those skilled in the art the aperture may be formed in a different shape.

Figure 3:
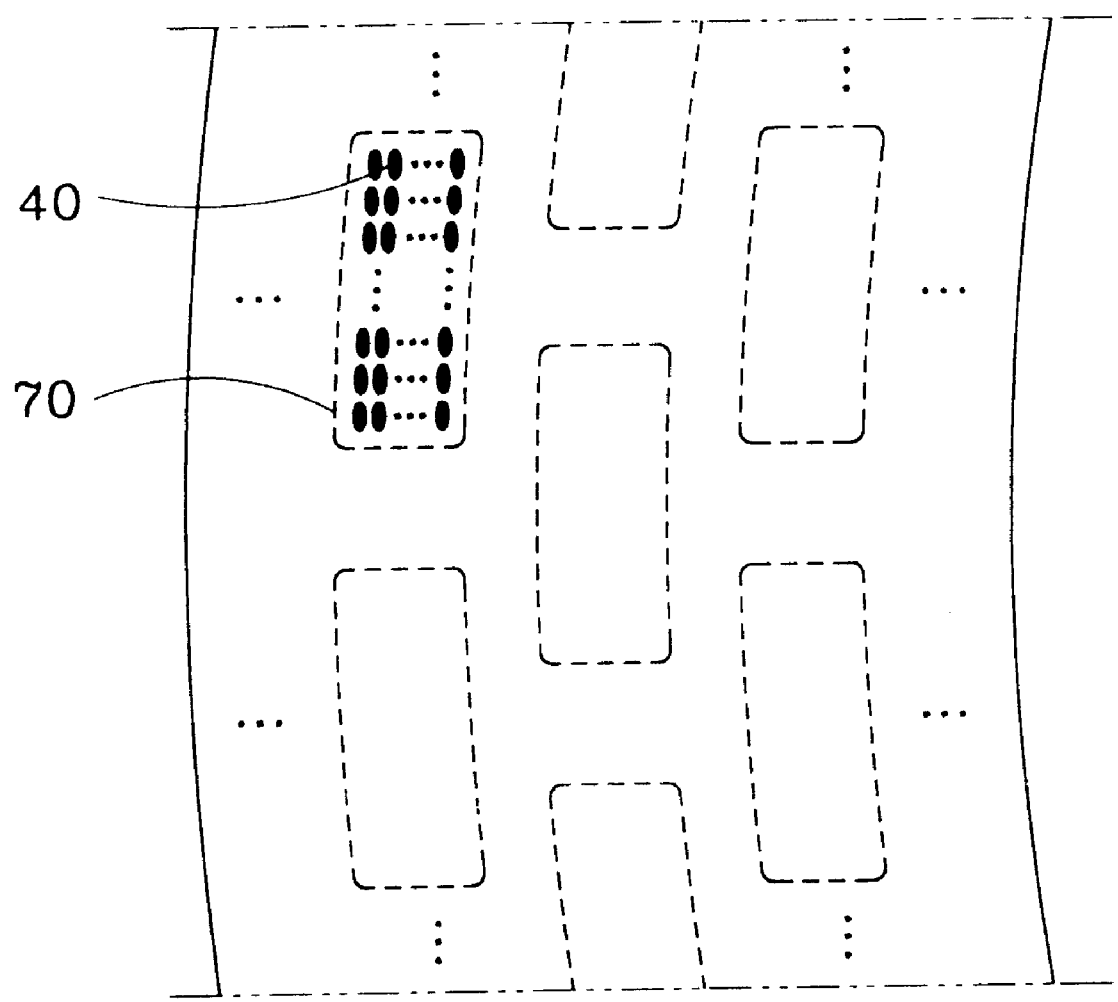
FIG. 3 shows a comparison between the size of an information bit recorded on the recording medium of an ultra-high recording density in accordance with the present invention and the size of an information bitrecorded on a conventional disc.

FIG. 3 shows a comparison between the size of an information bit recorded on the recording medium of an ultra-high recording density in accordance with the present invention and the size of an information bit recorded on a conventional recording medium. Reference numeral 70 denotes one of marks at which the information bit is recorded in the conventional art, and reference numeral 40 denotes one of marks at which information bit is recorded in accordance with the present invention. It will be readily appreciated by those skilled in the art that in regard to the recording medium having an identical width, the recording medium in accordance with the present invention can store much more information than the conventional recording medium. That is, in the conventional art, the size of the laser beam spot can resolve the mark as indicated by reference numeral 70. This scheme is similar to the new CD within a CD, since the mark in the conventional CD acts as another CD containing numerous marks in accordance with the present invention. However, in accordance with the present invention, the size of the laser beam spot can resolve a much smaller mark as indicated by reference numeral 40. Accordingly, it will be understood that the optical recording medium having an ultra-high density in accordance with the present invention further may include an optical recording medium as in the conventional optical recording medium.

Figure 4:
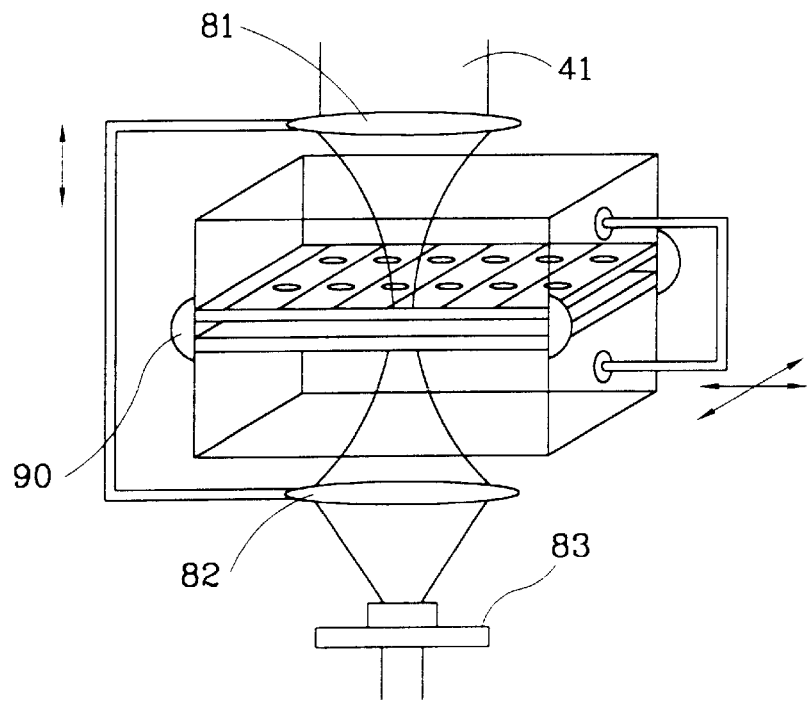
FIG. 4 illustrates the optical recording medium of a ultra-high recording density and an optical recording/reproducing device in accordance with a preferred embodiment of the present invention.

FIG. 4 illustrates the optical recording medium of an ultra-high recording density having the PAA 51, and an optical recording/reproducing device in accordance with the present invention. The laser light 41 outputted from a laser diode (not shown) is incident through a collimating lens 81 at one side of the recording medium, and a detector 83 detects the laser light 41 from the recording medium through a collimating lens 82 at the other side of the recording medium.

In accordance with the preferred embodiment of the present invention, the operation of the recording/reproducing device to record/reproduce the information on the recording medium will now be described.

When the laser light 41 focused by the collimating lens 81 receiving the laser light outputted from the laser diode is irradiated to the PAA 51, light having a considerably small sized spot and is generated, as compared with a wavelength of the laser light source. Here, the light is a near-field light existing around the apertures 40. When the recording medium is positioned in a region of the near-field, the diffraction limit can be overcome. Therefore, the near-field light can improve the recording density for recording the information on the optical recording medium.

In addition, the focused laser light covers one or more apertures, thereby achieving a parallel data transfer rate.

The present invention can be applied to types of various optical recording media, such as a CD-ROM, a CD-R, a RW and a RAM type media. Especially, in the cases of the CD-RW and the CD-RAM which are rewritable, the present invention can be applied to both a magneto-optical method and a phase-change recording media technology. According to the preferred embodiment of the present invention, the structure of the optical recording medium and the process of recording/reproducing the information thereon will now be described in regard to the phase-change recording media technology.

First, in the structure of the recording medium according to the present invention, the PAA of the upper plate (FIG. 2A) and the recording layer of the lower plate (FIG. 2B) are joined facing to each other, in order for the recording layer to be positioned within the near-field passing through the PAA. Here, the spacer having a thickness of a few to a few tens nm is inserted between the upper plate and the lower plate, so that the upper and lower plates can be relatively partially moved in a horizontal direction. The outer portions of the upper and lower plates are sealed up by using flexible adhesive such as an Si-rubber in order for the gap therebetween to be protected from the external environment. As illustrated in FIG. 4, when the upper plate and the lower plate are joined to be flexibly movable, the two surfaces facing to each other are not contacted during the process of reading and writing the information, thereby preventing a stacked film of the recording medium from being damaged due to a physical contact. In addition, contaminants such as dust are prevented from entering the space, thereby improving reliability.

Figure 5:
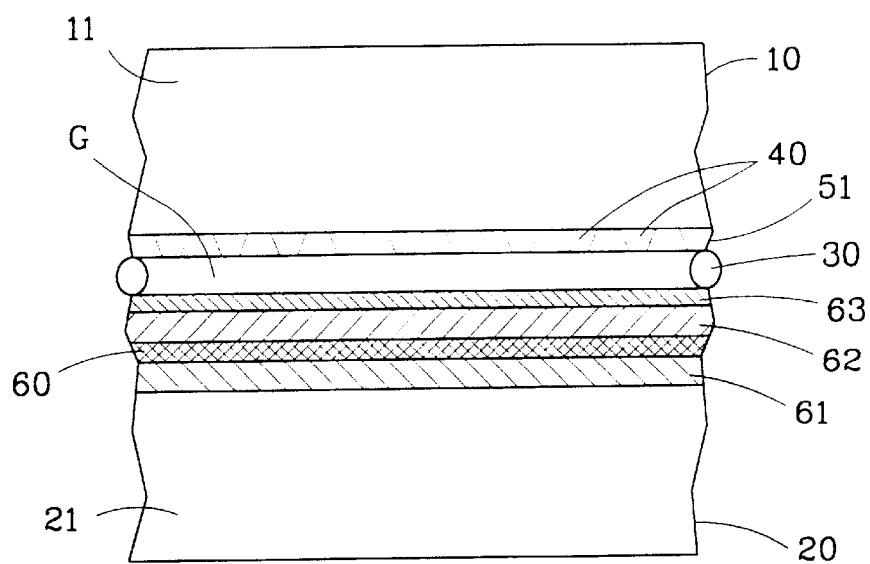
FIG. 5 is a partial cross-sectional view which illustrates a structure of the optical recording media in accordance with the preferred embodiment of the present invention.

FIG. 5 is a detailed diagram illustrating the structure of the recording medium having the PAA in accordance with the present invention. The lower plate 20 of the recording medium is formed by sequentially sputtering a first dielectric layer 61 for optically controlling a heat flowing of a substrate 21 on the substrate 21, the recording layer 60 recording the information on the dielectric layer 61, a second dielectric layer 62, and a protection layer 63.

The recording medium according to the present invention is formed by bonding the upper plate 10 to the thusly-constituted lower plate 20 having a predetermined gap G maintained by the spacer 30. Here, an injection-molded polycarbonate substrate which has been currently used or a glass substrate for improving the flatness of the recording medium may be used as the substrate of the recording medium.

The information is recorded on the recording layer of the recording media while the recording layer is in an amorphous (as-deposited) state, or initialized (crystallized). That is, in order to record the information, the laser diode in the pickup supplied with power induces the phase transformation by irradiating the laser beam to a local position of the medium focused and passing through the arrangement of the apertures, and positioned in the near-field, thereby recording (i.e., creating) crystalline marks in an amorphous matrix or amorphous marks in a crystal matrix.

When the information recorded in the amorphous matrix is reproduced, the variation of reflectance (or an absorption) of the laser light outputted from the amorphous or the crystalline marks is detected, and the information is accordingly read by corresponding different reflection degrees as "0" and "1" in binary digit.

Accordingly, the optical recording medium can record, erase and reproduce the information by forming a multi-layer film having a thickness of a few tens nm on a flat surface of the substrate, by providing a gap equal to or less than 10 nm, and by interacting the near-field light passing through the gap with the recording layer.

The process of recording/reproducing the information on the recording medium by a multiple aperture scanning storage MASS in accordance with the present invention will now be described.

The focused laser beam 41 through small aperture part 40-2 outputted from the laser diode (not shown) in the pickup (not shown) is focused on the aperture 40, and passed through the planar aperture array, thereby obtaining the evanescent field light. Here, the pickup is controlled by a macro-servo and a micro-servo in order to be moved to a position of recording or reading the information on the surface of the recording medium. The macro-servo implies that the pickup is controlled until it is coarsely moved to a predetermined region of the recording medium in order to record/reproduce the desired information. The micro-servo implies that the pickup is controlled to be locally scanned by the PZT, and finally moved to a desired position of the recording medium where the information is recorded, after being controlled by the macro-servo.

The process of performing the micro-servo control of the pickup by the PZT will now be described in more detail.

First, the PZT controls movement of the two plates separated from each other by a few tens nm. When the plates are controlled and scanned by the PZT, the substrates are not damaged due to friction, and the scanning is rapidly performed. The scanning operation is carried out in a state where the upper plate 10 having the PAA and the lower plate 20 having the recording layer are sealed up. Here, a scanning displacement in the X- and Y-directions is equal to or less than 1 $\mu$m (for example, corresponding to a gap between the apertures). A spacing in the Z-direction is approximately a few tens nm.

When the scanning operation of a region corresponding to one aperture (corresponding to a spot size of the beam) is finished, a focusing servo operation and a tracking servo are exactly performed so that a scanning head laser diode and a collimating lens can be moved to another aperture. The tracking servo operation is performed by moving an optical head and a signal detection unit, finishing the scanning operation of one aperture, and starting the scanning operation of another aperture.

In accordance with the present invention, a storage media drive, such as a CD player and a CD-ROM drive may be employed as the device for operating the multiple aperture scanning storage (MASS).

Here, the optical head includes the laser diode, the collimating lens and the focusing servo. The focusing and tracking servos are a kind of a feedback mechanism enabling the focusing to be performed on a desired position (here, the surface of the planar aperture array), identically to the conventional CD-ROM.

On the other hand, the device for recording/reproducing the information on the recording medium in accordance with the present invention can read the information in both a reflection mode and a transmission mode. After the near-field light passing through the aperture passes through the recording layer in the transmission mode, a far-field light is outputted from a lower portion of the glass side. The light is detected, thereby reading the information (here, the detection unit and the optical head are connected, and thus simultaneously moved).

The X, Y scanning system used in the recording/reproducing device in accordance with the present invention for moving the pick up to a desired position in order to record or reproduce the information on the recording medium fixes the upper plate having the PAA in order for the aperture to be positioned at the center of the laser beam, and moves the lower plate having the recording layer. Accordingly, the aperture is positioned at the center of the focused laser beam, and thus a laser beam of a certain intensity can be obtained from the aperture in scanning. As a result, an intensive power may be obtained, as compared with the conventional near-field system using the probe.

On the other hand, the Z-spacing between the upper and lower plates which are bonded together is determined by controlling the recording layer of the lower plate to be in the near-field region of the laser light in advance by using the PZT. The spacer is inserted in order to maintain the spacing.

According to another embodiment of the present invention, the information is recorded/reproduced on the recording medium by fixing the recording medium and moving the optical pickup, differently from the above-described optical recording medium. In this case, the optical recording medium may be fabricated in an efficient shape to record/reproduce the information. Also, the optical recording medium is provided with the PZT, and thus can be moved in the X- and Y-directions. In addition, the optical pickup is moved to every position of the optical recording/reproducing device, thereby recording/reproducing the information.

Method for Fabricating the Recording Medium

The storage media which can record and reproduce the information in accordance with the multiple aperture scanning storage (MASS) of the present invention are the CD-ROM, the CD-R, the CD-RW and the like. The method for fabricating the recording media such as the CD-RAM and the CD-RW in accordance with the present invention will now be described.

An injection-molded polycarbonate which has been currently used or a glass substrate for improved flatness of the recording medium may be used as the substrate of the recording medium.

The recording medium is properly constituted according to a recording and reproducing method. The reflection mode (when the light source and the optical detector are positioned on the same side of the medium) will now be exemplified.

A reflection layer on a substrate, a dielectric substance which can optically efficiently control a thermal flowing of the substrate on the substrate, a recording layer which can record information on the dielectric substance, a first dielectric layer, and a protection layer are sequentially sputtered.

The information is recorded in the recording layer of the recording medium when the recording layer is in an amorphous (as-deposited) state, or initialized (crystallized). That is, in order to record the information, the power supplied to the pickup induces the phase transformation of the recording layer by irradiating the laser beam to a local position of the medium focused and passing through the PAA, and positioned in the near-field, thereby recording a crystalline marks in an amorphous matrix or amorphous marks in a crystal matrix. The information is recorded and read by corresponding different reflectance or absorption as "0" and "1" in binary digit.

On the other hand, the Z-spacing between the upper and lower plates is determined by controlling the recording layer of the lower plate to be stably in the near-field region of the laser light in advance by using the PZT. The spacer is located between the upper and lower plates in order to maintain the spacing.

A method for fabricating the PAA according to the present invention will now be explained.

A film is formed by sputtering the reflection layer on a land and groove substrate or a flat-plate substrate (an Si-wafer or an injection-molded polycarbonate), and a photo-resist is spin-coated thereon.

When an electric field is externally applied to a particle having an electric charge on the coated substrate, the particle is accelerated. A pattern of the PAA is formed by using the thusly-generated electron beam of a wavelength of a sub-angstrom (~0.1 A)(i.e., electron beam lithography).

The PAA is fabricated by etching the pattern in an etchant.

A plastic forming method using a mold may be employed as another method for fabricating the PM. In this case, many apertures can be cheaply fabricated.

As discussed earlier, the device for recording/reproducing the recording medium using the near-field light in accordance with the present invention employs the evanescent field (in a region near the metal surface) transmitting the electric interaction controlled in a visible light region in order to store and read the information, thereby overcoming the diffraction limit and improving the recording density. In the conventional art, the aperture is formed by sharpening the optical fiber, depositing the reflective metal film, and removing the metal film from the tip of the optical fiber. The conventional device for recording/reproducing the information by using the aperture has the disadvantages in that the probe and the recording medium may be damaged in recording/reproducing the information, and that an access speed is low. The present invention overcomes such disadvantages.

In addition, the recording/reproducing device using the near-field in accordance with the present invention has the following advantages, as compared with the conventional art.

(a) A complicated device structure is not required to control the distance between the probe and the recording layer. Accordingly, it is necessary merely to control the PZT voltage for spacing, but the feedback is not necessary.

(b) The apertures may be regularly formed by an electron beam lithography process, instead of using the probe which is difficult to fabricate. The apertures can be cheaply mass-produced by a plastic forming method using the mold.

(c) As the probe is not employed and the data are preserved inside, the data are not damaged even when the device is touched or carried like a CD-ROM. In addition, if the surface of the device is scratched, it does not influence on reading the data. Accordingly, the recording side of the data and the apertures are prevented from being damaged.

(d) The apertures are periodically arranged, thus forming a structure for reading and writing the data in parallel. As a result, the data transfer rate is increased, and the access time is reduced.

(e) The structure of the player or driver is simplified. In the conventional system, it is essential to control the gap between the upper plate (including aperture array) and the lower plate(including recording layer) because of its inherent space self-control design(i.e., spacers), and to isolate vibration. However, the present invention is not sensitive to vibration, thereby simplifying the structure of the player.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. An optical recording medium comprising:

a metallic planar aperture array for receiving a laser light beam, and transmitting near-field light; and a recording layer positioned within the near-field of light transmitted by the metallic planar aperture array for optically recording/reproducing information therein/ therefrom in response to the near-field light transmitted through the metallic planar aperture array.

2. The recording medium according to claim 1, wherein an aperture of the metallic planar aperture array is in a circular, rectangular, or other geometric shape.

3. The recording medium according to claim 2, wherein the size of the aperture is smaller than a wavelength of the laser light source to receive the laser beam from laser light source and to generate the near-field light.

4. The recording medium according to claim 1, wherein the recording medium is in a circular, rectangular, or geometric shape.

5. The recording medium according to claim 1, wherein a gap is provided between the metallic planar aperture array and the recording layer, which gap is determined to be in the near-field of the laser light source, the gap being constantly maintained by a spacer or spacers at a predetermined size, and sealed from an external environment.

6. The recording medium according to claim 5, wherein the size of the spacers is determined to maintain the gap, and the material and shape thereof are determined to be horizontally movable.

7. The recording medium according to claim 1, further comprising a piezoelectric device, the piezoelectric device being driven by a micro-servo, for thereby relatively horizontally moving the metallic planar aperture array and the recording layer.

8. The recording medium according to claim 1, wherein the recording layer does not comprise a reflection layer, and thus information can be recorded and reproduced in transmission mode from both sides thereof.

9. The recording medium according to claim 1, wherein the recording layer comprises a reflection layer, and thus the information can be recorded and reproduced in reflection mode from only one side thereof.

10. A method for fabricating a recording medium comprising:

forming a recording layer on a first substrate;

forming a metallic planar aperture array on a second substrate; and bonding the first substrate to the second substrate with a predetermined gap therebetween.

11. The method according to claim 10, wherein the step of forming the metallic planar aperture array comprises:

forming a film by sputtering a reflection layer on the second substrate;

coating a photo-resist on the reflection layer;

forming a pattern of the metallic planar aperture array on the photo-resist coating using an electron beam; and etching the metallic planar aperture array pattern in an etchant.

12. The method according to claim 10, wherein the step of forming the metallic planar aperture array employs a plastic forming method using a mold.

13. The method according to claim 10, further comprising a step for sealing up the gap between the first substrate and the second substrate in order to be protected from an external environment.

14. A recording/reproducing device of a recording medium, comprising:

an optical pickup unit for outputting a laser beam to a single aperture of a recording medium including a metallic planar aperture array, and for generating and detecting a near-field light;

a piezoelectric device for controlling movement of the optical pickup unit;

a piezoelectric driving unit for driving the piezoelectric device; and a signal processing unit for recording and reproducing information on the optical recording medium through the optical pickup unit.

15. The device according to claim 14, wherein the piezoelectric driving unit operates the piezoelectric device included in the optical pickup unit, and is controlled by a macro-servo in order for the optical pickup unit to store/ reproduce the information at a predetermined position of the optical recording medium.

16. The method according to claim 14, wherein the optical pickup unit detects the laser beam incident on one or more apertures of the metallic planar aperture array, thereby processing the recorded information in parallel.

17. A method for optically recording/reproducing information at a predetermined position of a recording medium, comprising:

detecting information regarding a position of the recording medium where the data are to be recorded or reproduced, which recording medium includes a metallic planar aperture array;

moving a pickup unit in accordance with the detected information; and optically recording or reproducing a signal inputted or detected from the moved pickup unit on or from the recording medium.

18. The method according to claim 17, wherein the step for moving the pickup unit employs a macro-servo or a micro-servo.

* * * * *